United States Patent [19]

Kanashiki et al.

[11] Patent Number: 5,210,610
[45] Date of Patent: May 11, 1993

[54] IMAGE SIGNAL CORRECTION PROCESSING APPARATUS

[75] Inventors: Masaaki Kanashiki; Nobuo Minoura, both of Yokohama, Japan

[73] Assignee: Canon Kabushiki Kaisha, Tokyo, Japan

[21] Appl. No.: 687,454

[22] Filed: Apr. 18, 1991

[30] Foreign Application Priority Data

Apr. 26, 1990 [JP] Japan .................................. 2-114592
Apr. 26, 1990 [JP] Japan .................................. 2-114595
Apr. 27, 1990 [JP] Japan .................................. 2-111962

[51] Int. Cl.⁵ ............................................. H04N 5/57
[52] U.S. Cl. ..................................... 358/169; 358/166; 358/174
[58] Field of Search ............... 358/169, 166, 184, 174, 358/164, 160, 21 R; 382/18

[56] References Cited

U.S. PATENT DOCUMENTS

| | | | |
|---|---|---|---|
| 3,790,706 | 2/1974 | Gubala et al. | 358/169 |
| 4,187,519 | 2/1980 | Vitels et al. | 358/169 |
| 4,231,065 | 10/1980 | Fitch et al. | 358/166 |
| 4,337,514 | 6/1982 | Favreau | 358/166 |
| 4,470,067 | 9/1984 | Mino | 358/169 |
| 4,489,349 | 12/1984 | Okada | 358/168 |
| 4,499,486 | 2/1985 | Favreau | 358/166 |
| 4,695,884 | 9/1987 | Anastassiou | 358/166 |
| 4,731,662 | 3/1988 | Udagawa et al. | 358/75 |
| 4,852,002 | 7/1989 | Klauz | 358/169 |
| 4,864,392 | 9/1989 | Sato | 358/80 |

FOREIGN PATENT DOCUMENTS

| | | |
|---|---|---|
| 0204593 | 12/1986 | European Pat. Off. . |
| 0263765 | 4/1988 | European Pat. Off. . |
| 3408337 | 9/1984 | Fed. Rep. of Germany . |
| 3609049 | 10/1986 | Fed. Rep. of Germany . |
| 3714861 | 11/1988 | Fed. Rep. of Germany . |

*Primary Examiner*—James J. Groody
*Assistant Examiner*—Sherrie Hsia
*Attorney, Agent, or Firm*—Morgan & Finnegan

[57] ABSTRACT

The present invention relates to an apparatus by which, in the image display corresponding to a image signal, image signal is processed to adjust the contrast of the picture so as to provide automatically the contrast adjustment most suitable for respective level of image signal, thereby improving the quality of the picture by regulating the level of the image signal according to the information showing the distribution status of the levels of image signals input during a specified period of time.

21 Claims, 11 Drawing Sheets

(PRIOR ART)

(PRIOR ART)

(PRIOR ART)

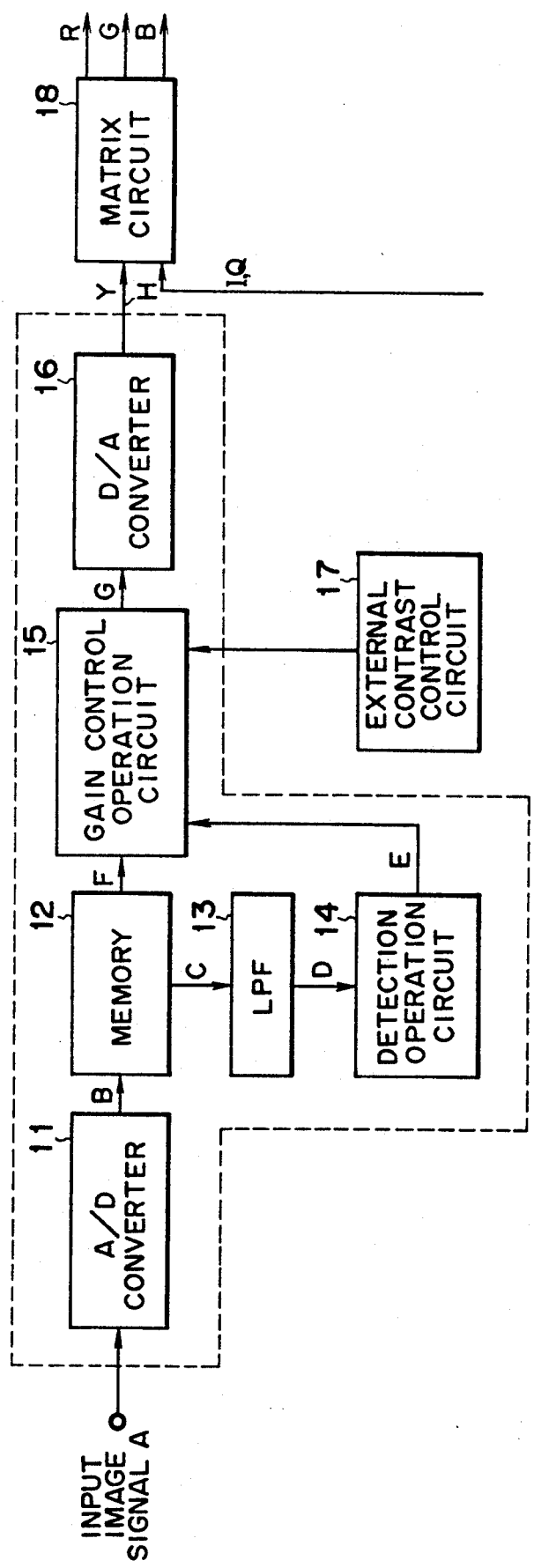

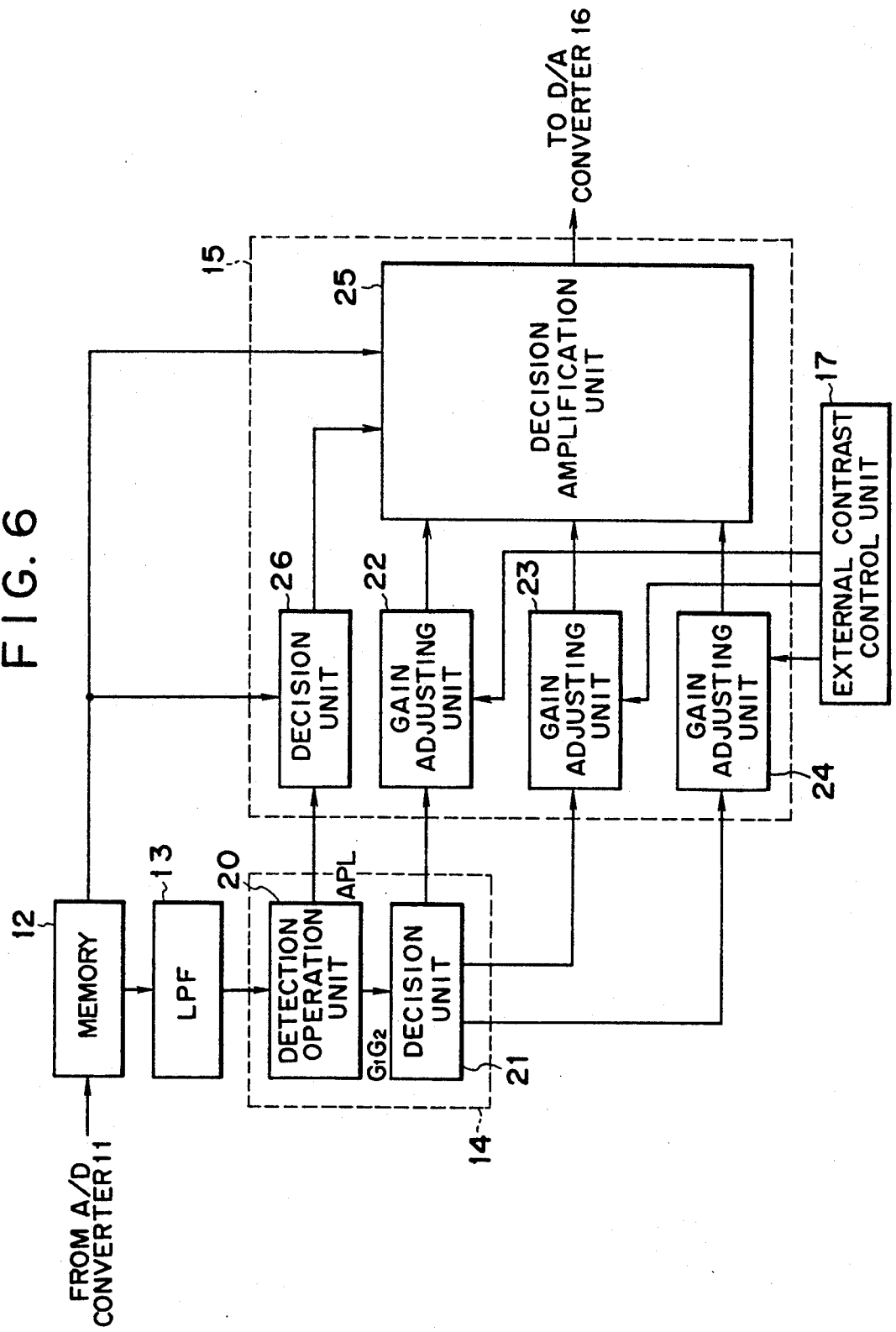

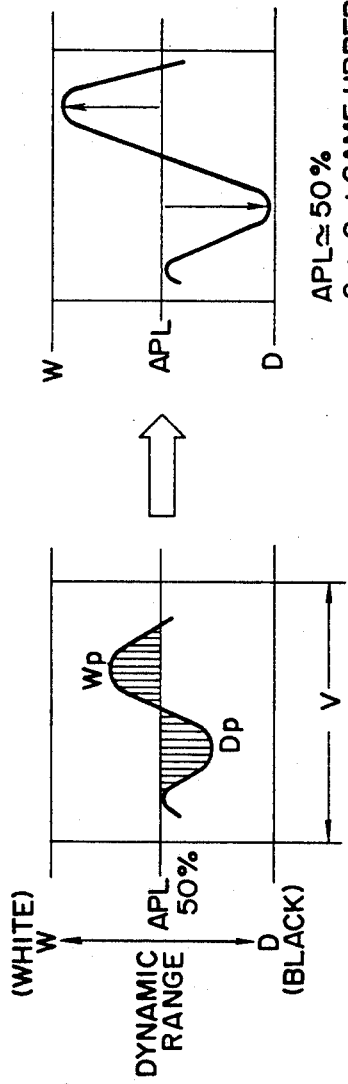
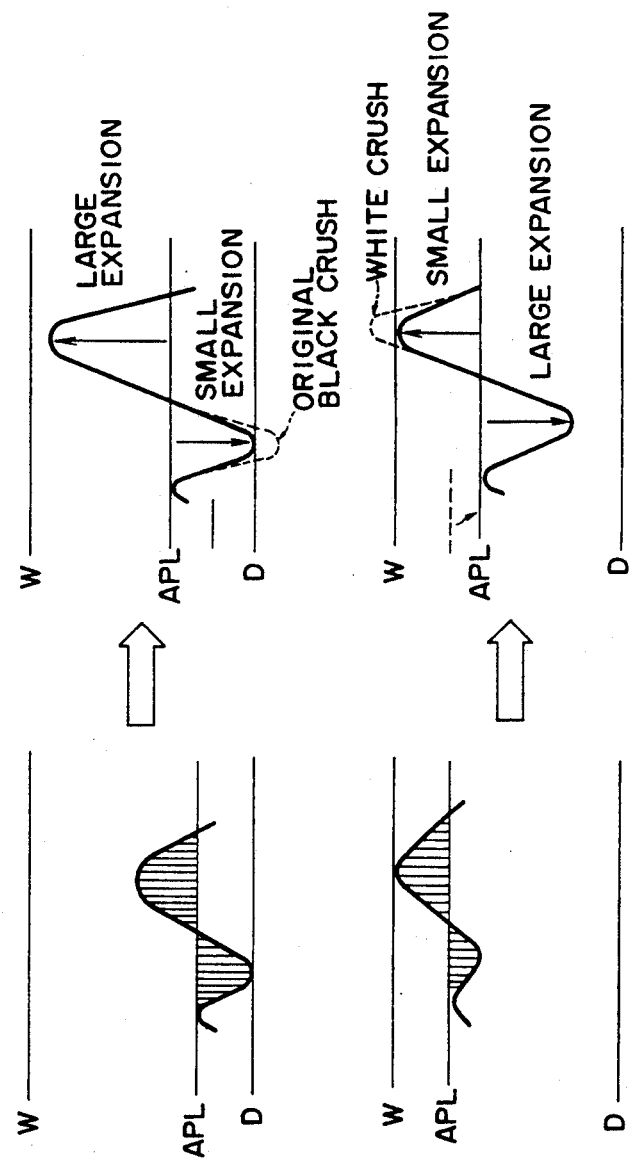
FIG. 7A
FIG. 7B
FIG. 7C

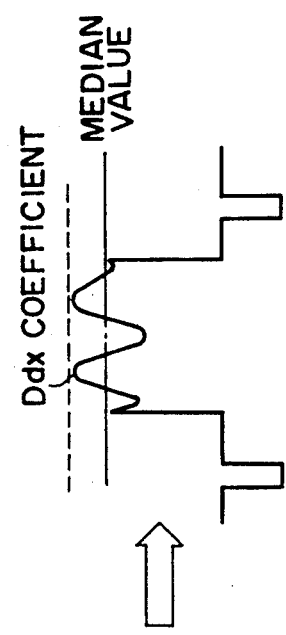
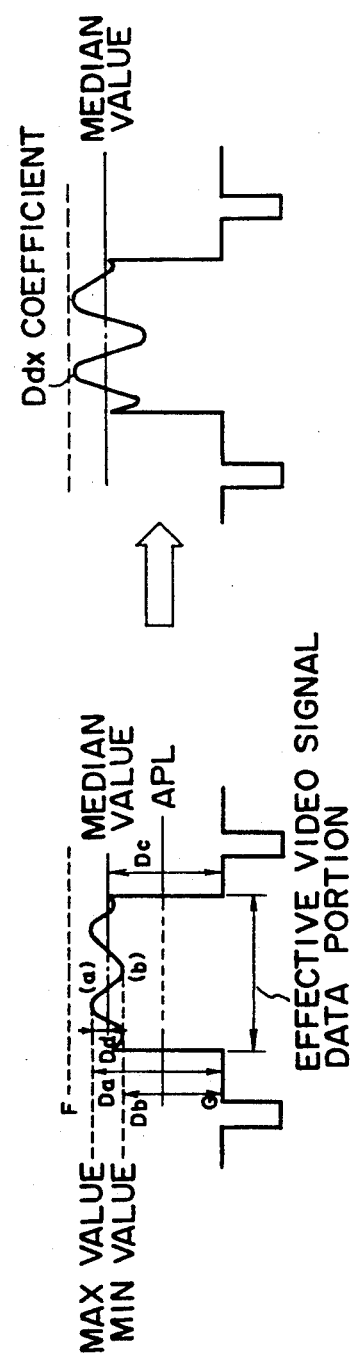
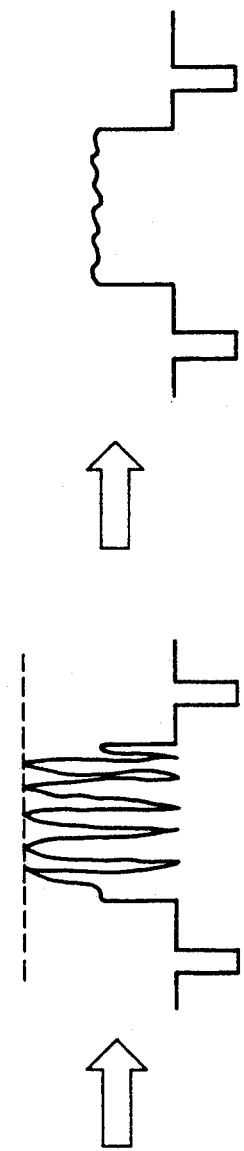
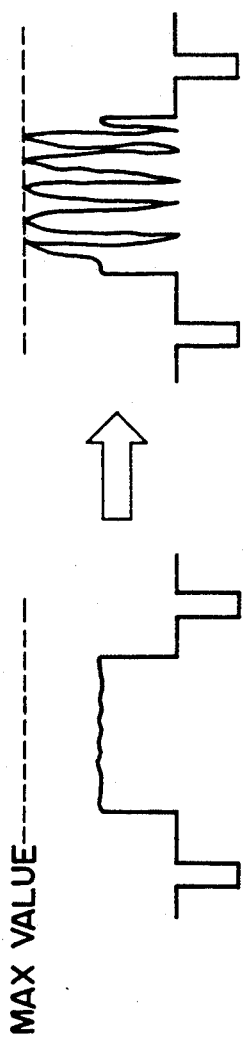

IMAGE SIGNAL CORRECTION PROCESSING APPARATUS

BACKGROUND OF THE INVENTION

1. Field of the Invention

The present invention relates to image signal processing apparatus which provides processing to image signals in order to adjust the image contrast in the display of pictures corresponding to image signals.

2. Related Background Art

Traditionally, when the contrast of pictures is adjusted in the display of pictures corresponding to image signals, the magnitude of a gain to the said image signal has been regulated, for example, irrespective of changes in the level of an input image signal. Therefore, once the contrast level is set, a specified gain is provided whether the level of the input image signal is high or low.

FIG. 1 shows the basic structure to conduct the above conventional contrast adjustment.

In FIG. 1, the input image signal A is amplified at the amplifier 1 according to the gain adjusted by the contrast control knob 2, i.e., the contrast level to be given as output image signal B.

Incidentally, in the case of gain adjustment by the conventional method of contrast control, since the image signals are amplified at a specified gain irrespective of the amplitude of the image signal, there occurs such degradation as white saturation and black crush on the braun tube screen which displays pictures corresponding to the image signals. As a result, the optimum range of contrast becomes very narrow, leading to changes in brightness or incoming light to the braun tube or inability to display good pictures unless the contrast is re-adjusted each time the input image signals change.

On the other hand, there exists such relationship as shown in FIG. 2 between the electric current (IK) of the cathode and the voltage (EGK) between the grid and the cathode of the braun tube (CRT) which is generally used to display pictures corresponding to image signals. Also, there is proportional relationship between the cathode current and brightness. The Ec in the Figure indicates a cut-off voltage, below which there is no glow of cathode current on the braun tube. Es is also the maximum permissible driving voltage, above which the cathode current becomes too large and the spot diameter of electron beam grows large resulting in the inability to show minute part of a picture and increase of X ray generated from the braun tube.

For this reason, the voltage applied to the braun tube should fall between Ec and Es. In other words, the range from Ec to Es is the dynamic range of the braun tube, which determines the contrast ratio of the braun tube (the ratio from black to white).

To put it another way, the braun tube should be operated with the amplitude of image signal within this range in order to gain pictures having sufficient contrast.

However, the image signals do not always move over the entire span of this range. Sometimes, the signal is located at a spot close to the black level indicated on (a) of FIG. 3, namely a small level of an image signal. In order to increase the contrast by utilizing the dynamic range of the braun tube, the variable part of the signal, as shown in (b) of FIG. 3, should be amplified and operated. Based on such basic thought a commercially variable method to utilize effectively the actuation range of the braun tube has been developed in which an autopedestal (FIG. 4) is given to lower automatically the level of pictoral signal corresponding to the most black part of the picture down to the pedestal level or the gain of the amplifier for image signals is raised (as in FIG. 3($b$)) to utilize the full actuation range of the braun tube.

But if the autopedestal is done in the above example of the conventional method on such picture which is bright and uniform like a single color of white, sufficient brightness is not gained since the color tends to be drawn to the direction of black. At the same time, the amplitude ratio becomes too large giving uncomfortable picture or if the gain of the amplifier is increased, the standard image signal gives higher contrast than the conventional one but entails such drawbacks as EGK exceeding ES from time to time in the case of image signals which contain white peaks. To prevent this, a limiter is sometimes given. However, since the white peak is limited by the limiter, there is a shortcoming that the while peak (white color) is not sufficient.

SUMMARY OF THE INVENTION

This invention intends to provide the image signal processing apparatus which solves the above-mentioned problems. Other purpose of this invention is to provide the image signal processing equipment which allows the automatic contrast adjustment according to the level of image signals.

Under this purpose, according to the present invention, there is provided the image signal processing apparatus as one embodiment of the present invention, comprising level distribution information generating means for generating information which indicates the level distribution condition of input image signals during a specified period of time and level control means for controlling levels of image signals according to information generated by the level distribution information generating means.

The other purpose of the present invention is to provide image signal processing apparatus which is capable of making contrast adjustment most suitable for respective level of image signals.

Under such purpose, according to the present invention, there is provided the image signal processing equipment as one embodiment of the present invention, comprising:

conversion means for converting analogue image signal into digital data and output said digital data;

detection and operation means for detecting and operating the maximum value, minimum value and intermediate value of the above digital data;

coefficient calculation means for calculating the first coefficient based on the maximum, minimum and intermediate values detected and operated by said detection and operation means;

coefficient generating means for generating the second coefficient;

coefficient operating means for conducting operation using the first coefficient calculated by the coefficient calculating means and the second coefficient calculated by the coefficient generating means to calculate the third coefficient; and level control means for controlling the level of image signal using the third coefficient calculated by the coefficient operating means.

Further, another objective of this invention is to provide image signal processing equipment which is capable of improving visual quality of picture.

Under such purpose, according to the present invention, there is provided the image signal processing apparatus as one embodiment of the present invention comprising:

conversion means for converting analogue image signal into digital data and output said digital signal;

detection and operation means for detecting and operating the maximum, minimum and intermediate values of the above digital data and at the same time shift the level of the calculated intermediate value according to the level of the detected maximum or minimum values;

coefficient calculation means for calculating the first coefficient on the basis of the maximum, minimum and intermediate values detected and operated by said detection and operation means;

coefficient generation means for generating the second coefficient;

coefficient operation means for operating and calculate the third coefficient using the first coefficient calculated by said coefficient calculation means and the second coefficient generated by said coefficient generation means; and level control means for controlling the level of the pictorial signal using the third coefficient calculated by said coefficient operation means.

Another objective and characteristics of the present invention will become evident from the detailed explanation about the mode of working with reference to the drawings which follow.

BRIEF DESCRIPTION OF THE DRAWINGS

FIG. 5 is a drawing showing an outlined structure of a contrast adjustment circuit as the first embodiment of the present invention;

FIG. 6 is a drawing showing the structure of the detection/operation circuit and the gain control circuit in the contrast adjustment circuit shown in the above FIG. 5;

FIGS. 7A-7C are drawings to explain the contrast adjustment actuation by the contrast adjustment circuit shown in the above FIG. 5;

FIGS. 11A and 11B are drawings to explain the maximum, minimum and intermediate values used in the second embodiment of the present invention;

FIGS. 12A-12C are drawings to explain the amplitude ratio used in the second embodiment of the present invention;

DESCRIPTION OF THE PREFERRED EMBODIMENTS

Figure 1:
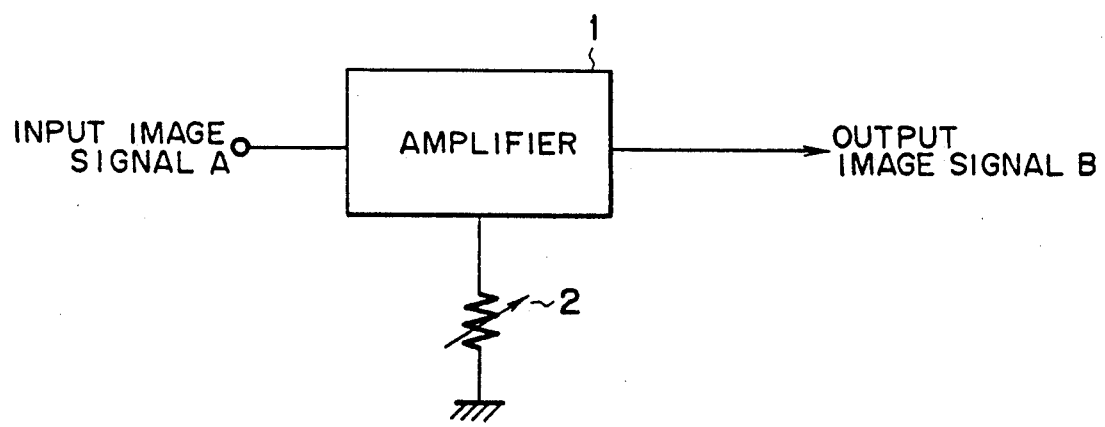
FIG. 1 is a drawing showing the basic structure to make the conventional contrast adjustment.
Figure 2:
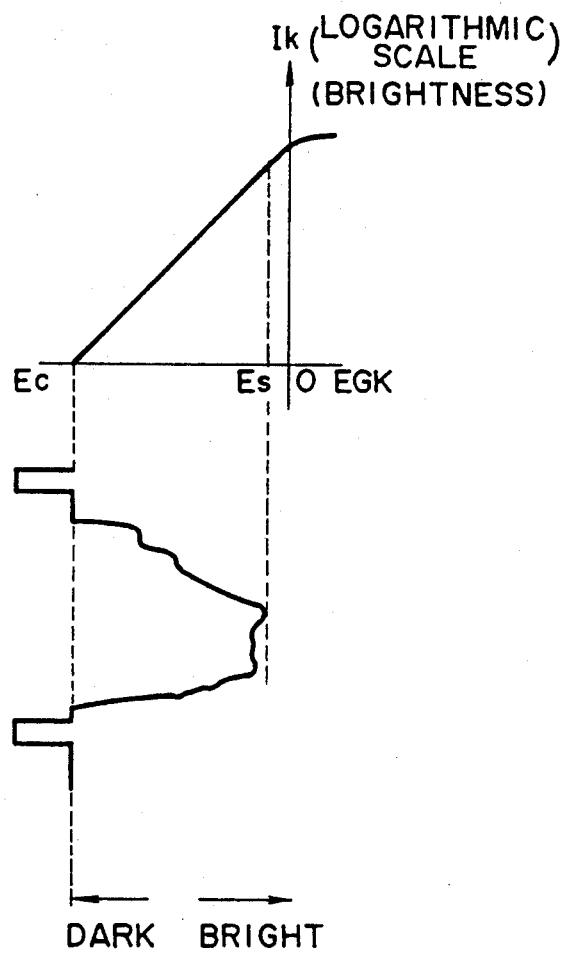
FIG. 2 is a drawing showing the characteristics of the braun tube.
Figure 3:
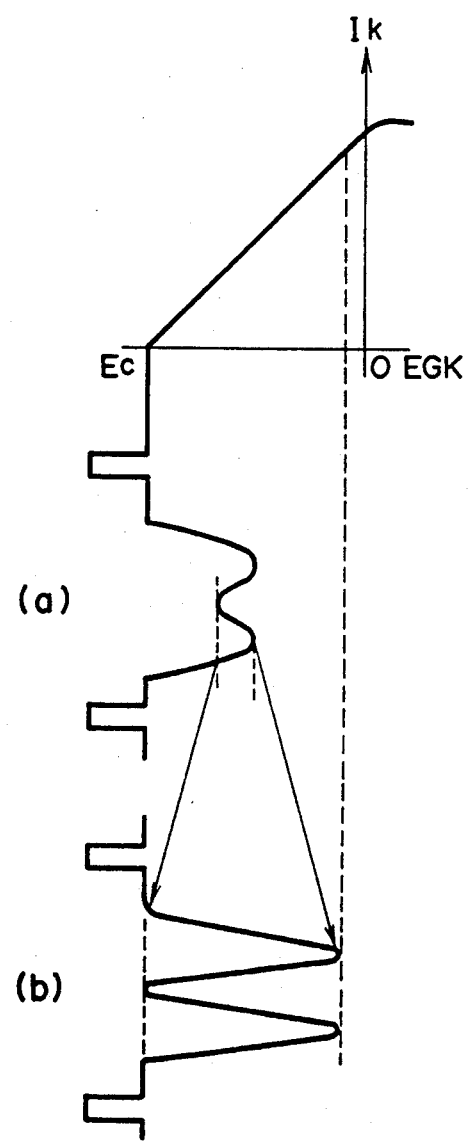
FIG. 3 is a drawing to explain the contrast of a picture.
Figure 4:
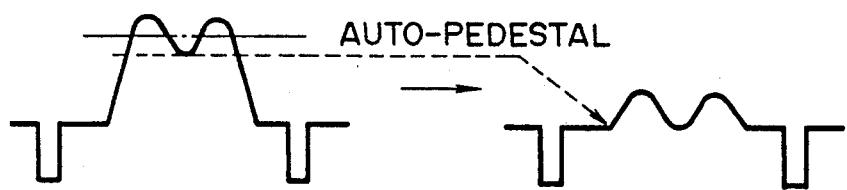
FIG. 4 is a drawing to explain the actuation of autopedestal.

Below explained is the present invention with reference to its embodiments.

FIG. 5 is a drawing showing an outlined structure of the contrast adjustment circuit as the first embodiments of the present invention.

In FIG. 5, item 11 is an A/D converter, item 12 is a field or frame memory, item 13 is low-pass filter, item 14 is a detection operation circuit, item 15 is a gain control operation circuit, item 16 is a D/A converter, and item 17 is an external contrast control circuit.

In FIG. 5, the input image signal A is converted to the digital data B at the A/D converter 11. Then, the digital data B is supplied to the digital data of the memory 12, in which the digital data corresponding to one screen (1 field or 1 frame volume) is stored. The digital data stored in the said memory is supplied to LPF13. Then, the data, after the over-shoot and pre-shoot generated in the pictorial signal indicated on the digital data by said LPF3 are removed, are supplied to the detection/operation circuit 14.

The detection and operation circuit 14 and the gain control circuit 15 have the structure shown in FIG. 6.

As shown in FIG. 6, the digital data output by the above LPF13 are supplied to the detection/operation average value of the digital data corresponding to one screen (APL) accumulated in the above memory 12 using the supplied digital data and also detect the maximum value (WP) and the minimum value (DP) of the digital data corresponding to one screen which are stored in the above memory 12.

The detection/operation part 20 determines the gain value of pictorial signal based on the following operation formula from the detected or operated avarage value (APL), the maximum value (WP), the minimum value (DP) and the threshold maximum value (W) and the threshold minimum value (D) of the image signal.

$$G1 = \left| \frac{W - APL}{WP} \right| \quad (1)$$

$$G2 = \left| \frac{D - APL}{DP} \right| \quad (2)$$

The above operation formula (1) is the formula to determine the gain value G1 in case the digital data value is larger than the average value (APL). The operation formula (2) is the formula to determine the gain value G2 is the formula to determine the gain value G2 in case the digital data value is smaller than the average value (APL). In the operation formulas (1) and (2), the gain values G1 and G2 are equal to or greater than 1.

As mentioned above, in the detection/operation part 20, the calculated average value APL is supplied to the judgement part 26 within the gain control operation circuit 15 which will be explained later. The gain values G1 and G2 are supplied to the judgement part 21 within the detection/operation circuit 14.

The judgement part 21 outputs a signal to select one of the gain adjustment parts 22, 23 and 24 which generate differing gain adjustment data according to the size of the gain values G1 and G2 supplied from the above detection/operation part 20.

In other words, in case the gain values G1 and G2 supplied from the detection/operation part 20 are, for example, 1 G1 and G2<1.2, the judgement part 21 supplies the above selection signal to the gain adjustment part 22 and supplies, for example, the gain adjustment GA which indicates "0" from the gain adjustment part 22 to the judgment amplification part 25. If 1.2<G1 and G2<3, the above selection signal is supplied to the gain adjustment part 23, the gain adjustment data GB which, for example, indicates "1.5" is supplied from the said gain adjustment part 23 to the judgment amplification part 25. Further, in case 3<G1, G2, the above selection signal is supplied to the gain adjustment part 24, and the gain adjustment data GC which, for example, indicates "3" is supplied from the gain adjustment part 24 to the judgement amplification part 25.

Values for the gain adjustment data GA, GB and GC which are output from the gain adjustment parts 22, 23 and 24 can be set by the external contrast control circuit 17.

The average value data APL output from the above-mentioned detection/operation part 20 is supplied also to the judgment part within the gain control operation circuit 15 as stated above. The judgement part 26 determines whether the digital data stored in the above memory 12 is larger or smaller than the said average value data APL and supplies the results to the judgment amplification part 25.

The judgement amplification part 25 sets the amplification gain of judgement data supplied from the above judgement part 26 and of the digital data supplied from the above memory 12 according to the gain adjustment data GA, GB and GC supplied from the above gain adjustment parts 22, 23 and 24. And the said digital data are amplified according to the set amplification gain and the amplified digital data G is supplied to the D/A converter 16 of FIG. 5.

In the D/A converter 16, the digital data supplied from the gain control operation circuit 15 are converted to the analogue image signal (luminance signal Y). Then, the luminance signal Y is output from the said D/A converter 16 and supplied to the matrix circuit 18 along with the color differential signals I and Q processed in a color signal processing circuit which is not shown on the drawing. The matrix circuit 18 forms RGB signals from the supplied luminance signal Y, color differential signals I and Q, which are then supplied to the display part, including the braun tube, which is not shown on the drawing.

FIG. 7 shows the amplification processing of the above image signals according to the distribution condition of levels of input image signals. FIG. 7A shows the case in which the image signal shows ordinary brightness, FIG. 7B is the case of dark situation and FIG. 7C is the case of bright situation. In the FIG. 7, the lefthand side shows the distribution condition of the level of input image signals and the right-hand side indicates the distribution condition of the level of image signals after the amplification processing.

As shown in FIG. 7, according to the embodiment of the present invention, no black collapse non white collapse occur even in case the level distribution of the input image signals is situated close to the threshold dynamic range of image signal level, and the dynamic range of the image signal level (the area of W through D in FIG. 7) is utilized effectively to make the most suitable adjustment of contrast, leading to the display of the appealing picture.

Figure 8:
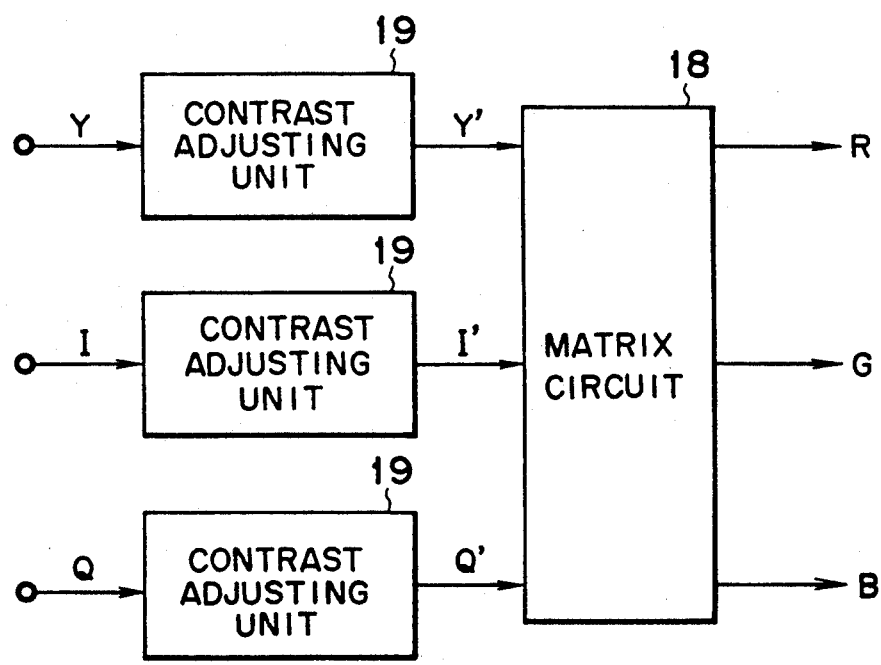
FIGS. 8 and 9 are drawings showing the structure of application examples in the embodiment indicated in the above FIG. 5.
Figure 9:
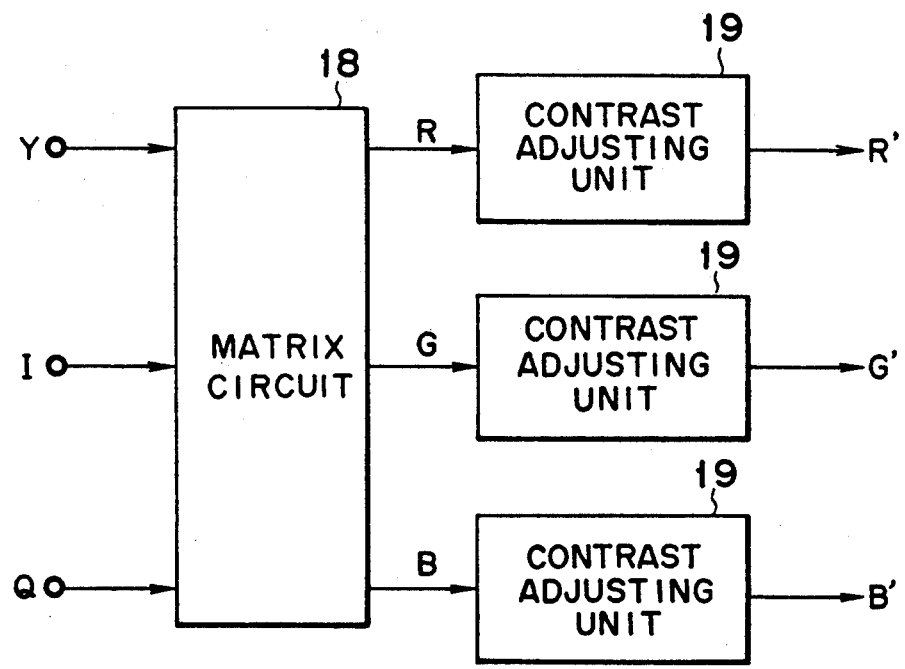

In the embodiment of FIG. 5, contrast adjustment is made only about the luminance signal of image signals. As shown in FIG. 8, the contrast adjustment part 19 having the same structure as in FIG. 5 is provided not only to the luminance signal Y but also to color differential signals I and Q to do the same processing, thereby conducting contrast adjustment most suitable for color picture receiving tube. In the embodiment indicated on FIGS. 5 and 8, the level control is given to the luminance signal Y, color differential signals I and Q for the purpose of contrast adjustment. As shown in FIG. 9, matrix processing is done to the luminance signal Y and color differential signals I and Q, and after being converted to RGB signal, the contrast adjustment part 19 may be provided to each of the R (red), G (green) and B (blue) signals to make contrast adjustment.

In this way, according to the structure of this embodiment, automatic adjustment of contrast becomes possible depending upon the level of the input image signals so that the phenomena of white collapse and black collapse on the screen of the display equipment can be inhibited even when image signals of large levels are input, leading to the display of appropriate contrast picture, which is easy to see.

In case the display equipment has the braun tube, it becomes possible to prevent tailing phenomenon due to the storage phenomenon of CRT drive transistor which is easy to take place when pictorial signals of high level are input, resulting in the improvement of picture quality.

Furthermore, in case the display equipment has liquid crystal display, the dynamic range of the LC driving circuit is so narrow that the contrast adjustment by the structure shown in the embodiment is particularly effective, making it possible to restrict the phenomena of white collapse and black collapse leading to the display of contrast picture which is easy to see.

What follows below is an explanation about the second and third embodiments of the present invention.

Figure 10:
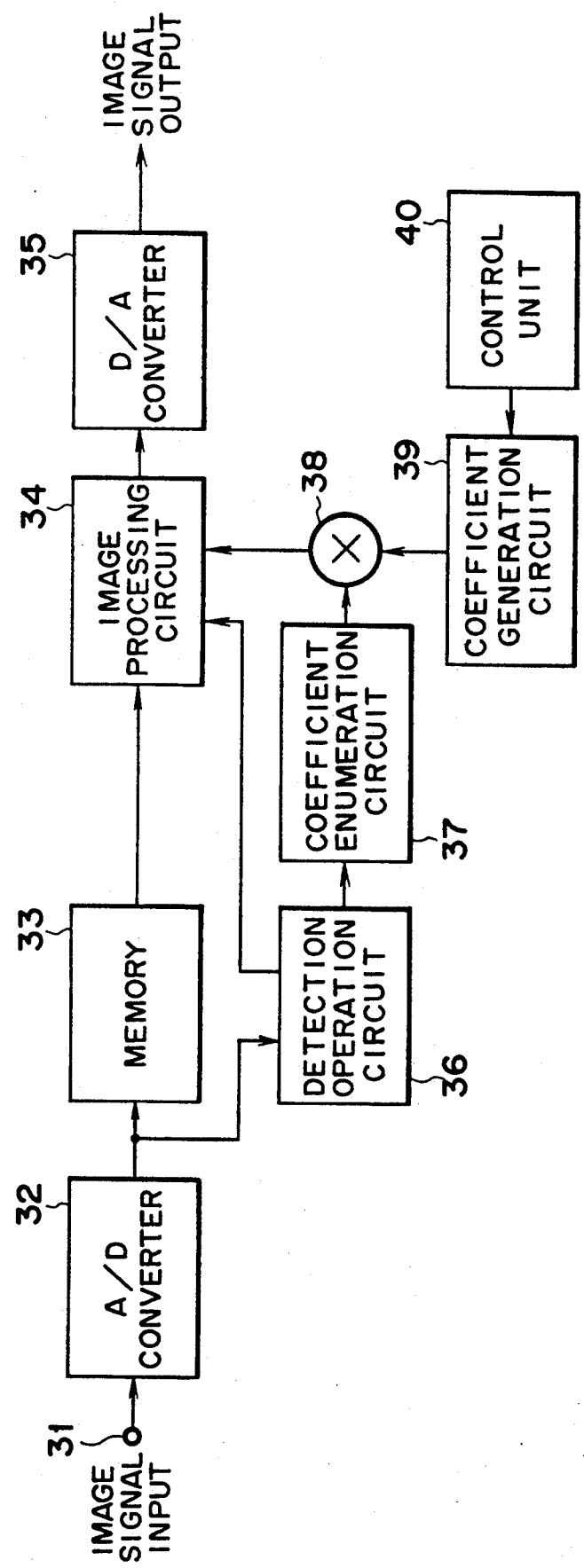
FIG. 10 is a drawing showing an outlined structure of the contrast adjustment circuit as the second embodiment of the present invention.

FIG. 10 shows an outlined structure of the contrast adjustment circuit as the second embodiment of the present invention. The item 31 is an input terminal through which image signal is fed. The item 32 is an analogue/digital (A/D) converter is which after going through the low-pass filter (not shown on the drawing) to restrict the band in a specified area, the analogue image signal is subjected to sampling and quantizing and then converted into the digital data. The item 33 is a memory which memorizes and delays the digital data formed on the above A/D converter 32. Item 34 is a image processing circuit to do such processing as the multiplying of digital data by a coefficient. Item 35 is a digital/analogue (D/A) converter. Item 36 is a detection/operation circuit which detects the maximum value and the minimum value and calculate an intermediate value between the detected maximum value and minimum values. Item 37 is a coefficient calculation circuit to determine the amplification rate. Item 38 is a coefficient operation circuit which multiplies the coefficient calculated from item 37, a coefficient calculation circuit by the coefficient generated at item 39, a coefficient generation circuit. Item 39 is a coefficient generation circuit which generates a coefficient varying the amplification rate to obtain a desired contrast ratio. Item 40 is a control part which variably controls coefficients generated from item 39, the above coefficient generation circuit.

In the above structure, the image signal input from the input terminal 31 is band-restricted through the low-pass filter (not shown on the drawing), which restricts bands in a desired band, and is then subjected to sampling (not shown on the drawing since the sampling clock generation circuit and power source are known) and quantizing at the A/D converter 32. Thus, the signals are converted into digital data, supplied to the memory circuit 33 one after another. For example, after data corresponding to one period of horizontal scanning are memorized, the signals are sent to the image processing circuit 34.

The digital data output from the A/D converter 32 are supplied to the detection/operation circuit 36. The detection operation circuit 36 detects, from among digital data expressing effective image signals excluding synchronous part and pedestal part of image signals shown on FIG. 11, the maximum level data as the maximum value Da, the minimum level data as the minimum value Db, and the intermediate value Dc as $$\left[ \text{minimum value} + \left( \frac{\text{the maximum value} - \text{the minimum value}}{2} \right) \right]$$

to supply data to the coefficient calculation circuit 37. With the maximum value obtained in the item 36, a detection operation circuit as Da, the minimum value as Db, the intermediate value as Dc, the maximum value of the possible digital data as F, the pedestal level as G and further $$\frac{Da - Db}{2}$$

as Dd the coefficient calculation curcuit 37 selects and outputs the smaller of $$\frac{F - Dc}{Dd} \text{ and } \frac{Dc - G}{Dd}.$$

By obtaining difference between the maximum possible value of the digital data or the pedestal level and the intermediate level with the above-mentioned operation, it can be determined which of the maximum value direction and the pedestal level direction has smaller allowance for amplification. Then, division by Dd is made to obtain the amplification rate. In other words, this coefficient calculation circuit 37 is capable of obtaining the intermediate value of the image signals and then calculating the largest possible amplification rate without clipping the image signals.

The coefficient generation circuit 39 generates a coefficient with which an operator varies the image contrast freely as desired. Thus, according to the indication data generated at the control part 40, a coefficient below is generated. If the coefficient value is 1, the contrast ratio is improved.

The coefficient calculated at the coefficient calculation circuit 3 can extend from the minimum value of 1 to the maximum value close to infinity. The coefficient generated from the coefficient generation circuit 39 is below 1. The coefficient is input to the coefficient oepration circuit 38 to conduct the multiplication processing.

Incidentally, with respect to the middle level signal having a small level difference between the maximum and the minimum values, as shown in FIG. 12A, i.e. having a small contrast ratio, there arises a picture having a large amplification ratio (coefficient) as shown in FIG. 12B, giving a picture with visual uncomfortableness.

As a result, it is necessary, in the coefficient operation circuit 38, to determine (or do limiter) the maximum value of the amplification rate (coefficient) which is to be set. For example, if the maximum value of the amplification rate (coefficient) is 2, the signal in FIG. 12A does not become a signal of FIG. 12B but is comparable to that of FIG. 12C, not leading to visual uncomfortableness.

Also, for example, if the coefficient value generated from the coefficient generation circuit 39, the coefficient calculated in the coefficient operation circuit 38 is more than 1 and lower than 2, then being supplied to the image processing circuit 34.

In this pictorial processing circuit 34, the intermediate value obtained by the detection/operation circuit 36 is multiplied by the coefficient (amplification rate) obtained in the coefficient operation circuit 38 to conduct digital data processing as shown in FIG. 11B.

The digital data processed in the image processing circuit are converted to analogue signals at the D/A converter 35 and, after being subjected to the band restriction in the low-pass filter shown on the drawing, are supplied to the driving circuit of the braun tube shown on the drawing.

As explained above, the maximum value and the minimum value of image signals are detected by digitalizing the image signals. Further, by obtaining the intermediate value and structuring to vary the gain coefficient of image signals according to the said intermediate value, the picture corresponding to the image signal can be displayed with sufficient contrast with substantially improved quality of picture.

Figure 13A:
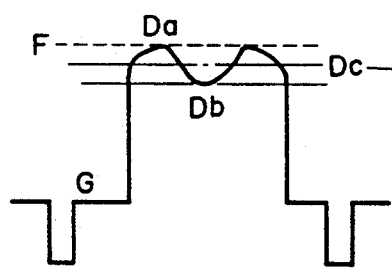
FIGS. 13A and 13B are drawings to explain the procedure for movement of intermediate value used in the third embodiment of the present invention.

Meanwhile, in the second embodiment mentioned above, for example, if the maximum value Da detected in the coefficient calculation circuit 37 of FIG. 10 is the same as the maximum possible value F of the digital data as shown in FIG. 13A, there is no improvement about contrast (this situation remains unchanged even if the minimum value Db is the same as the pedestal- level G).

Hence, in case either one of $$\frac{F - Dc}{Dd} \text{ or } \frac{Dc - G}{Dd}$$

calculated in the detection / operation circuit 36 is close to "1" and the other is large in the third embodiment of the present invention, the contrast is improved by moving the intermediate value Dc. The moving amount of the intermediate value Dc in this case should be 15-20% so that there may be no sense of incongruity visually.

Figure 13B:
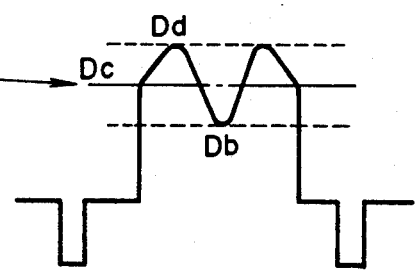

In this way, the contrast is improved as shown in FIG. 13B by shifting the level of intermediate value or doing white elongation or black elongation with respect to signals which have a small contrast ratio at a place close to white peak or black level.

As explained above, by moving appropriately the intermediate value calculated from the maximum value and the minimum value according to the maximum value and the minimum value of image signals and further varying the coefficient of gains of image signals according to the intermediate value thus moved, a picture corresponding to the image signals can be displayed with sufficient contrast, leading to substantial improvement of picture quality.

What is claimed is:

1. An image signal processing apparatus which processes image signals, comprising:
   (A) level distribution information generating means for receiving an image signal, detecting the level distribution state of image signals received over a predetermined period and generating information indicative of the level distribution state detected; and
   (B) level control means for controlling the level of the image signal according to the information generated by said level distribution information generating means so that a dynamic range indicative of the level distribution state of the image signal detected by said level distribution information generating means becomes wider than a predetermined level range.

2. An apparatus according to claim 1, wherein said level distribution information means includes:
   (a) conversion means for converting image signals into digital data;
   (b) memory means for memorizing digital data corresponding to image signals of one picture output by said conversion means; and
   (c) detection and operation means for detecting and operating data which shows the maximum value, the minimum value and the average value of the digital data values corresponding to image signals of one picture memorized by said memory means.

3. An apparatus according to claim 2, wherein said level control means includes:
   (a) amplification means for amplifying image signals; and
   (b) amplification gain control means for controlling amplification gains of said amplification means according to the data showing the maximum value, the minimum value and the average value detected and operated by said detection and operation means.

4. An apparatus according to claim 3, wherein said amplification gain control means is capable, in the above amplification means, of controlling plural kinds of amplification gains to amplify image signals at respectively differing amplification gains and is arranged such that the said plural kinds of amplification gains can vary respective setting.

5. An apparatus according to claim 3, wherein said amplification gain control means is arranged such that the data showing the average value detected and operated by said detection and operation means and the digital data memorized in said memory means are compared to set the amplification gain of said amplification means according to the results of the comparison.

6. An apparatus according to claim 1, wherein said image signals are composed of a luminance signal component and two kinds of color-differential signal component.

7. An apparatus according to claim 1, wherein said image signals are composed of red signal component, green signal component and blue signal component.

8. An apparatus according to claim 1, wherein said level distribution information generating means includes:
   (a) conversion means for converting image signals into digital data;
   (b) memory means for memorizing digital data which corresponding to the image signals of a specified quality output from said conversion means;
   (c) detection and operation means for detecting and operating data showing the maximum value, the minimum value and the central value of those indicated by the digital data which correspond to the image signals of a specified quantity momorized in said memory means;
   (d) coefficient calculation and operation means for calculating and operating a first coefficient based on the maximum value, the minimum value, and the central value detected and operated by said detection and operation means;
   (e) coefficient generation means for generating a second coefficient; and
   (f) coefficient operation means for operating a third coefficient using the first coefficient calculated by said coefficient calculation means and the second coefficient generated by said coefficient generation means.

9. An apparatus according to claim 8, wherein said level control means includes:
   (a) amplification means for amplifying image signals; and
   (b) amplification gain control means for controlling amplification gain of said amplification means according to the third coefficient calculated by said coefficient operation means and the data showing the central value calculated by said detection and operation means.

10. An apparatus according to claim 1, wherein said level distribution information generating means includes:
    (a) conversion means for converting image signals into digital data;
    (b) memory means for memorizing digital data which correspond to image signals of a specified quantity output from said conversion means;
    (c) detection and operation means for detecting and operating the maximum value, the minimum value and the intermediate value of the digital data which correspond to image signals of a specified quantity memorized in said memory means and for shifting a level of intermediate value calculated according to the level of the maximum or minimum value detected.
    (d) coefficient calculation and operation means for calculating and operating a first coefficient based on the maximum value, the minimum value and the center value detected and operated by said detection and operation means;
    (e) coefficient generation means for generating a second coefficient; and
    (f) coefficient operation means for operating a third coefficient using the first coefficient calculated by said coefficient calculation means and the second coefficient generated by said coefficient generation means.

11. An apparatus according to claim 10, wherein said level control means includes:
    (a) amplification means for amplifying image signals; and
    (b) amplification gain control means for controlling amplification gain of said amplification means according to the third coefficient calculated by said coefficient operation means and data showing the central value which was calculated and shifted in a level by said detection and operation means.

12. An image signal processing apparatus to process image signals, comprising:

(A) conversion means for converting analogue image signals into digital data and output said digital data;

(B) detection and operation means for detecting and operating the maximum value, the minimum value and the intermediate value of said digital data;

(C) coefficient calculation means for calculating a first coefficient based on the maximum value, the minimum value and the intermediate value detected and operated by said detection and operation means;

(D) coefficient generation means for generating a second coefficient;

(E) coefficient operation means for operating a third coefficient using the first coefficient calculated by said coefficient calculation means and the second coefficient generated by said coefficient generation means; and (F) level control means for controlling the level of image signals using the third coefficient calculated by said coefficient operation means.

13. An apparatus according to claim 12, wherein said level control means includes:
   (a) amplification means for amplifying image signals; and
   (b) amplification gain control means for controlling an amplification gain of said amplification means according to data showing the third coefficient calculated by said coefficient operation means and the central value calculated by said detection and oepration means.

14. An apparatus according to claim 13, wherein said amplification gain control means sets the amplification gain of said amplification means in such a way that image signals multiplied by the third coefficient calculated by said coefficient operation means may be output with, as a center of amplitude, the level indicated by the data showing the intermediate value detected and operated by said detection and operation means.

15. An apparatus according to claim 12, wherein said detection and operation means includes memory means for memorizing digital data corresponding to image signals of a specified quantity output from said conversion means and is arranged so as to detect and operate data showing the maximum, the minimum and the intermediate values of the digital data which correspond to image signals of a specified quantity memorized in said memory means.

16. An apparatus according to claim 15, wherein said memory means is arranged so as to memorize those digital data which correspond to image signals of one horizontal scanning period output from said conversion means.

17. An image signal processing apparatus which processes image signals, comprising:

(a) conversion means for image signals into digital data and output said digital data;

(b) detection and operation means for detecting and operating the maximum value, the minimum value and the intermediate value of said digital data and for shifting the level of the intermediate value calculated according to the level of the detected maximum value or the minimum value;

(c) coefficient calculation means for calculating a first coefficient based on the maximum value, the minimum value and the intermediate value detected and operated by said detection and operation means;

(d) coefficient generation means for generating a second coefficient;

(e) coefficient operation means for operating a third coefficient using the first coefficient calculated by said coefficient calculation means and the second coefficient generated by said coefficient generation means; and (f) level control means for controlling the level of image signals using the third coefficient calculated by said coefficient operation means.

18. An apparatus according to claim 17, wherein said level control includes:
   (a) amplification means for amplifying image signals; and
   (b) amplification gain control means for controlling an amplification of said amplification means according to data showing the third coefficient calculated by said coefficient operation means and the central value which was calculated and shifted in level by said detection and operation means.

19. An apparatus according to claim 18, wherein said amplification gain control means sets the amplification gain of said amplification means in such a way that image signals multiplied by the third coefficient calculated by said coefficient operation means may be output with, as a center of amplitude, the level indicated by the data showing the intermediate value detected and operated by said detection and operation means.

20. An apparatus according to claim 17, wherein said detection and operation means includes memory means for memorizing digital data corresponding to image signals of a specified quantity output from said conversion means and is arranged so as to detect and operate data showing the maximum, the minimum and the intermediate correspond to image signals of a specified quantity memorized in said memory means.

21. An apparatus according to claim 20, wherein said memory means is arranged so as to memorize those digital data which correspond to image signals of one horizontal scanning period output from said conversion means.

* * * * *